(12) United States Patent
Klass

(10) Patent No.: US 6,468,426 B1
(45) Date of Patent: Oct. 22, 2002

(54) CYCLONE SEPARATOR

(76) Inventor: Georg Klass, Moorenweiser Strasse 4, D-82299 Türkenfeld (DE)

(*) Notice: Subject to any disclaimer, the term of this patent is extended or adjusted under 35 U.S.C. 154(b) by 0 days.

(21) Appl. No.: 09/646,065

(22) PCT Filed: Mar. 12, 1999

(86) PCT No.: PCT/EP99/01638
§ 371 (c)(1),
(2), (4) Date: Sep. 13, 1999

(87) PCT Pub. No.: WO99/47269
PCT Pub. Date: Sep. 23, 1999

(30) Foreign Application Priority Data

Mar. 13, 1998 (DE) .......................................... 198 11 090

(51) Int. Cl.$^7$ .............................. B01D 21/26; B04C 3/06
(52) U.S. Cl. .................... 210/304; 210/512.1; 209/715; 209/725; 55/459.1
(58) Field of Search .............................. 210/304, 512.1; 55/459.1; 209/715, 723

(56) References Cited

U.S. PATENT DOCUMENTS

| | | |
|---|---|---|
| 2,726,766 A | 12/1955 | Rakowsky |
| 2,787,374 A | 4/1957 | Krebs |
| 2,873,815 A | 2/1959 | Swayze |
| 3,568,837 A | 3/1971 | Laval, Jr. et al. |
| 3,969,096 A | 7/1976 | Richard |
| 4,863,605 A | 9/1989 | Reinecker |

FOREIGN PATENT DOCUMENTS

| | | |
|---|---|---|
| DE | 3826454 A1 | 2/1990 |
| DE | 3911444 A1 | 10/1990 |
| EP | 564992 A2 | 10/1993 |
| EP | 618012 | 10/1994 |
| FR | 1310736 | 3/1963 |

OTHER PUBLICATIONS

PTO 2002–1617–Translation of FR 1,310,736 published on 10–1961.*

* cited by examiner

Primary Examiner—David A. Reifsnyder
(74) Attorney, Agent, or Firm—Senniger, Powers, Leavitt & Roedel

(57) ABSTRACT

A cyclone separator includes a housing generally symmetric about its central longitudinal axis and an inlet for introduction of a fluid containing dispersed substances. At least a portion of the housing wall is shaped to form a flow rectifier. An outlet for the cleaned fluid comprises a tube through the bottom wall of the housing having an axis coaxial with the longitudinal axis. An outlet for the dispersed substances has the shape of an annular channel in the bottom wall disposed adjacent the tube and adjacent a rotation axis of the fluid whereat high-density substances settle.

8 Claims, 10 Drawing Sheets

CYCLONE SEPARATOR

BACKGROUND OF THE INVENTION

The invention pertains to a cyclone separator with a housing essentially rotation-symmetrical about a longitudinal axis, an inlet located in the vicinity of a front surface of the housing for an essentially tangential inlet of a fluid containing disperse substances and at least one outlet for the dispersed substances and at least one outlet for the cleaned fluid.

In the known cyclone separators of the kind described above, due to the design the degree of separation of the smallest solid particles (dispersed substances) whose density differs very little from the density of the fluid, is in general quite small, so that the fluid is improperly cleaned from these dispersed substances.

Therefore, it is the problem of the present invention to create a cyclone separator with an improved degree of separation.

SUMMARY OF THE INVENTION

Due to the invented cyclone separator, the degree of separation will be improved significantly, so that even dispersed substances which have a minor density difference in comparison to the fluid can be dependably separated. Thus the cleaned fluid can be sent, e.g., directly to control and regulation equipment or to high pressure pumps without any additional filtering steps, and can be used, for example, in sludge suction carts for cleaning of effluent channels to generate liquid streams at high pressure.

The cyclone separator according to this invention features a considerably improved efficiency (degree of separation).

For example, according to the first design solution, at a specified inlet speed of the fluid to be cleaned (fluid with dispersed substances), the rotary pulse of the fluid to be cleaned is increased by the placement of the inlet at a ring channel surrounding the housing, due to the greater distance to the longitudinal axis of the housing, and according to the second design, by the rotation of the rotor turning in the cyclone separator. Thus, the inertial forces (e.g., centrifugal forces) occurring in the cyclone separator can be increased, so that the separation effect for substances of different density will be improved.

Due to the formation of at least a portion of the housing wall at the level of the ring channel in the form of a flow rectifier connecting the ring channel to the interior of the housing, according to the first design, the fluid to be cleaned will be guided with much less turbulence into the interior of the cyclone housing, so that a steady wall flow without interfering secondary flow and with greatly reduced turbulence will form right in the inlet region. Due to this nearly complete rectification of the flow, the fluid to be cleaned will perform a well-defined rotational motion about the longitudinal axis of the housing, starting at the inlet region, so that right in this region the centrifugal forces will effectively contribute toward separation of the dispersed substances.

Due to the dish shaped bottom wall inclined toward the longitudinal axis of the housing, the fluid to be filtered will be guided continuously in the direction of the longitudinal axis of the housing. Thus, as the radius decreases, the rotational velocity of the rotating fluid to be cleaned will increase, so that the separating effect for substances with different density will increase.

Due to the tube extending concentric to the longitudinal axis, the primary rotation flow about the longitudinal axis of the invented cyclone separator will move concentric to the housing. This likewise improves the separating effect, since the flow is of very defined formation, especially in regions with very high flow velocities, like that occurring in the vicinity of the bottom wall.

Since the tube is also serving as outlet for the cleaned fluid and protrudes past the bottom wall in the direction of the inlet, it is necessary that the fluid flow coming from the inlet and rotating about the longitudinal axis be reversed at the bottom wall in the direction of the inlet, so that at least a portion of the fluid to be cleaned will be guided along the tube in the direction of the inlet. In order that the fluid to be cleaned can flow off through the tube, it must additionally be diverted by about 180 degrees. Thus, with each change of direction of the fluid to be cleaned, inertial forces will occur which additionally promote the separating effect of substances of different density. These forces are all the greater, the larger the flow velocities and the smaller the radii for the change of direction of the fluid flow. Due to the centrifugal effects described above, and in particular also due to the two changes in direction of the fluid to be cleaned, at the tube positioned concentric to the longitudinal axis, we obtain a clean fluid which is essentially cleaned free of dispersed substances, which is why this tube serves as outlet for it.

The dispersed substances are carried off through the outlet openings in the bottom wall, and due to the fluid flow, preferably a coagulation of the dispersed substances is prevented and they can thus be fully eliminated.

In one expedient embodiment of the first design solution, the flow rectifier extends along the perimeter of the housing wall. Thus, in a favorable manner, the flow is directed essentially rotation-symmetrical into the housing, so that a well-defined, nearly turbulence-free, rotation-like primary flow will form in the rotation-symmetrical housing. The flow rectifier can thus have a meshed-grid-like (screen-like) or honeycomb-like structure, depending on the fluid to be cleaned, the speed of the incoming fluid and the amount of turbulence of the inlet fluid. The flow rectifier can also be composed of rods positioned parallel to the longitudinal axis, e.g., along the perimeter of the housing, to form a lattice structure, or it can be formed by gaps in the housing wall running parallel to the longitudinal axis. In this case, the individual channels of the flow rectifier can be linear or curved toward the interior of the housing, in order to control the fluid flowing through the flow rectifier accordingly. The inlet of the flow into the interior of the housing can be affected also by the angle of the channels of the flow rectifier relative to the direction of the inlet fluid. For example, the gaps in the housing wall forming a flow rectifier can be formed at an angle to the particular radial plane, instead of being in a radial direction, for example, so that the fluid flowing into the interior of the housing will have preferably a tangential speed component, so that in the interior of the housing an enhanced rotational flow will form around this longitudinal axis.

Furthermore, several flow rectifiers can also be set up along the perimeter of the housing wall, and each flow rectifier will extend over a portion of the housing wall at the level of the ring channel. Thus the flow rectifiers positioned in this configuration can be similar to or also different from each other.

Preferably the housing wall will be of cylindrical shape at the level of the inlet region, so that preferably the formation of a defined rotational primary flow will take place right in the inlet region.

In an additional, preferred design format, the housing wall is cylindrical-shaped along the longitudinal axis between the inlet region and the dish-like bottom surface. But it can also have a conical shape running in the direction of the bottom surface, or the dish shape of the bottom wall can continue up to the level of the inlet region.

In an additional, expedient embodiment, the bottom wall is connected concave to the outlet for the cleaned fluid, so that preferably a well-defined flow deflection of the fluid to be cleaned will occur toward the inlet. This will likewise promote the amount of separation between fluid and the dispersed substances.

In an additional, preferred design embodiment of the cyclone separator according to this invention, a ventilation valve is provided on the housing in the vicinity of the inlet. Thus it is possible in a favorable manner, to send the cleaned fluid to high pressure pumps or control devices where an inlet of air is to be prevented.

The cyclone separator according to this invention can have preferably an additional outlet tube which runs concentric to the longitudinal axis and in sections within the tube for the outlet of the cleaned fluid, such that an annulus for the outlet of the cleaned fluid is formed between the two tubes, and such that the second tube protrudes in the direction of the inlet past the tube serving as outlet for the cleaned fluid and forms an additional outlet. Thus, depending on the volume of the flow through the two tubes, which can be controlled, for example, by suitable values (such as magnetic valves), a fractional separation of the cleaned fluid or of the dispersed substances is possible. For example, floating substances can be eliminated through the second tube.

The invented cyclone separator in yet another favorable design format can have a filter device operating according to the retention principle located in front of the outlet for the cleaned fluid. Thus, in a favorable manner, the filter effect for the cleaned fluid will be increased, so that the cleaned fluid can also be sent even to sensitive control devices or high-pressure pumps, for example. In this manner, the filter device can be composed of a hollow cylindrical filter placed concentrically along the longitudinal axis, and the one end of the filter will be connected to the outlet for the cleaned fluid.

Preferably, in conjunction with the filter device, there will be in the flowing fluid, at a short distance from one surface region of the filter, at least one flow control surface, such that a nozzle effect increasing the rate of flow is exerted onto the portion of the fluid passing through between flow control surface and the surface region of the filter. Based on the nozzle effect increasing the rate of flow, preferably the static pressure on the filter surface will decrease at the surface region of the filter located roughly opposite the flow control surface, so that the filter cake will be detached in the filter. In addition, with an appropriate shape and positioning of the flow control surface, with a suitable gradient between filter outer and filter inner surface, there will be a reversal of the direction of flow through the filter due to the reduced static pressure, that is, a portion of the filtrate will flow back into the fluid to be cleaned, so that the filter residue will be additionally detached from the surface of the filter facing the fluid to be cleaned. This filter residue can then again be exposed to the inertial forces described above, and will then be separated through the outlet for the dispersed substances. Due to this self-cleaning process of the regions of the filter surface in the vicinity of the nozzle effect, filters with considerably smaller filter openings can be used and thus a much improved degree of separation of the cyclone separator can be achieved. Furthermore, the filter can be operated much longer.

BRIEF DESCRIPTION OF THE DRAWINGS

The invention will now be explained and described in greater detail based on several design examples to which the attached drawings pertain. We have.

DETAILED DESCRIPTION OF THE PREFERRED EMBODIMENT

Figure 1:
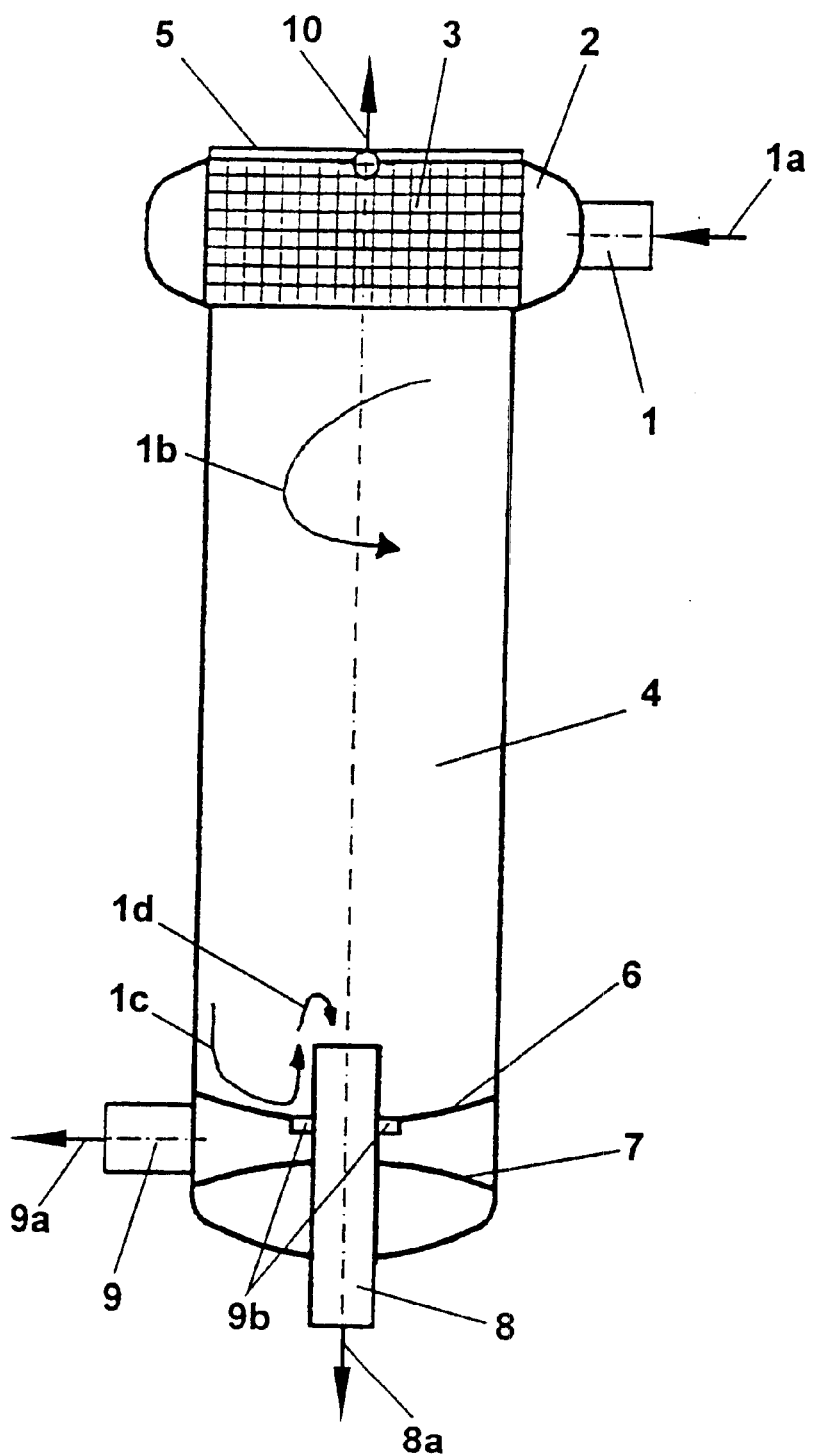
FIG. 1, a schematic side view of one design example of the invented cyclone separator with a cylindrical-shaped housing wall.

FIG. 1 shows schematically one design example of the invented cyclone separator with a cylindrical-shaped housing 4, an inlet 1 for a fluid 1a containing dispersed substances, which opens essentially tangentially in the vicinity of one front surface 5 of the housing 4 into a ring channel 2 surrounding the housing 4. In this case, at the height of the ring channel 2 at the housing wall there is a flow rectifier 3, which connects the interior space of the housing 4 with the ring channel 2, and through which the fluid 1a to be cleaned is moved into the interior of the housing. For venting the invented cyclone separator in the illustrated design example there is a venting valve 10 provided in the vicinity of the front surface 5. On the front side 7 of the housing 4 located roughly opposite the inlet, there is on the inside of the housing a dish-shaped bottom wall 6 inclined to the longitudinal axis of the housing 4, said bottom wall has a tube 8 located concentric to the longitudinal axis of the hosing 4 passing through it. The tube 8 here, is located slightly in front of the bottom wall 6 by a predetermined length in the direction of the front surface 5, which is located in the vicinity of the inlet 1. The tube 8 is used as an outlet for the cleaned fluid 8a, which is carried away from the inlet 1 in the illustrated design example in the direction of the longitudinal axis. In the bottom wall 6 in the vicinity of the tube 8 there are outlet openings 9b which act as outlet for the dispersed substances 9a, which are eliminated in the illustrated design example, through a channel formed by the bottom wall 6 and the front surface 7 via an outlet 9. The outlet openings 9b can be designed in the form of drilled holes, but also an opening 9b in the shape of a ring channel placed around the outlet 8 can serve as outlet opening.

Figure 2:
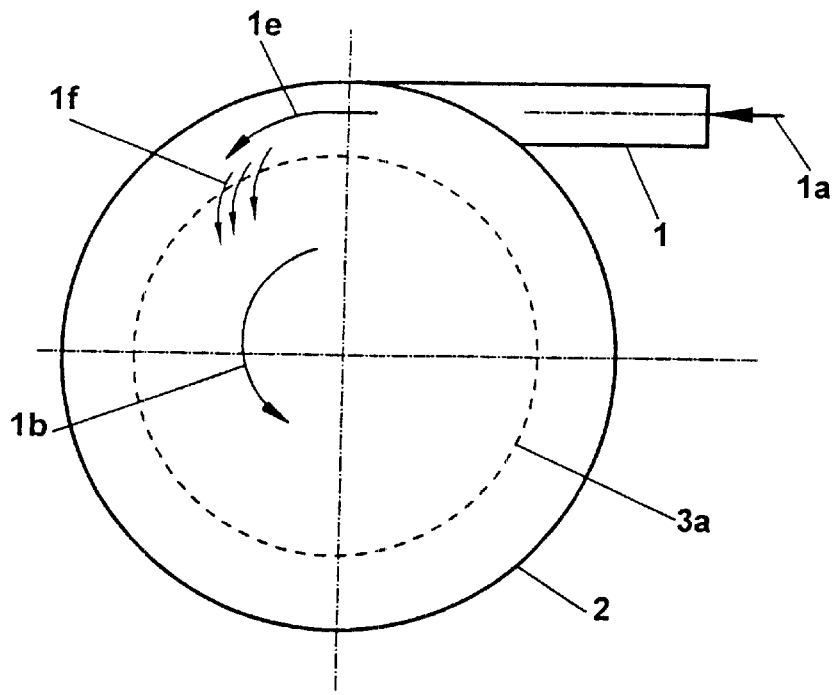
FIG. 2, a schematic top view of the cyclone separator illustrated in FIG. 1, with a flow rectifier extending along the perimeter of the housing wall.

FIG. 2 shows a schematic, top view of the design example illustrated in FIG. 1, with the inlet 1 for the fluid 1a to be cleaned positioned tangential to the ring channel 2. The transversal movement of the fluid 1a to be cleaned is placed into a rotational movement 1e right in the ring channel. The fluid 1a to be cleaned flows through the flow rectifier 3a into the interior of the housing 4 (indicated by the arrow 1f). The flow rectifier 3a in the design example illustrated in FIG. 2, is positioned along the perimeter of the housing at the height of the ring channel 2 and can be composed of a mesh grid (screen), a honeycomb-like network, rods running parallel to the longitudinal axis of the cyclone separator and provided around the perimeter and forming a lattice structure, or by slits in the housing wall running parallel to the longitudinal axis. The channels of the flow rectifier which guide the fluid 1a to be cleaned into the interior of the housing 4 (indicated by the arrow 1f), can be aligned radially or at an angle to the plane running through the longitudinal axis allocated to the particular channel. If the channels are positioned at one such angle pointing in the flow direction (which is dependent on the properties of the flowing fluid), then preferably the fluid to be cleaned is directed into the interior of the housing by means of a powerful rotational motion.

Due to the rotation-symmetrical formation of the housing 4 and due to the tangential inlet of the fluid 1a to be cleaned, in the interior of the housing 4 there likewise forms a rotational flow 1b about its longitudinal axis, which is also called the primary flow or primary rotation flow. Due to a pressure gradient between the inlet 1 and the outlets 8, 9, the fluid to be cleaned will be transported in the direction of the outlets 8, 9, so that overall a screw-like rotational movement 1b will form along the longitudinal axis of the housing 4 for the fluid to be cleaned.

Figure 3:
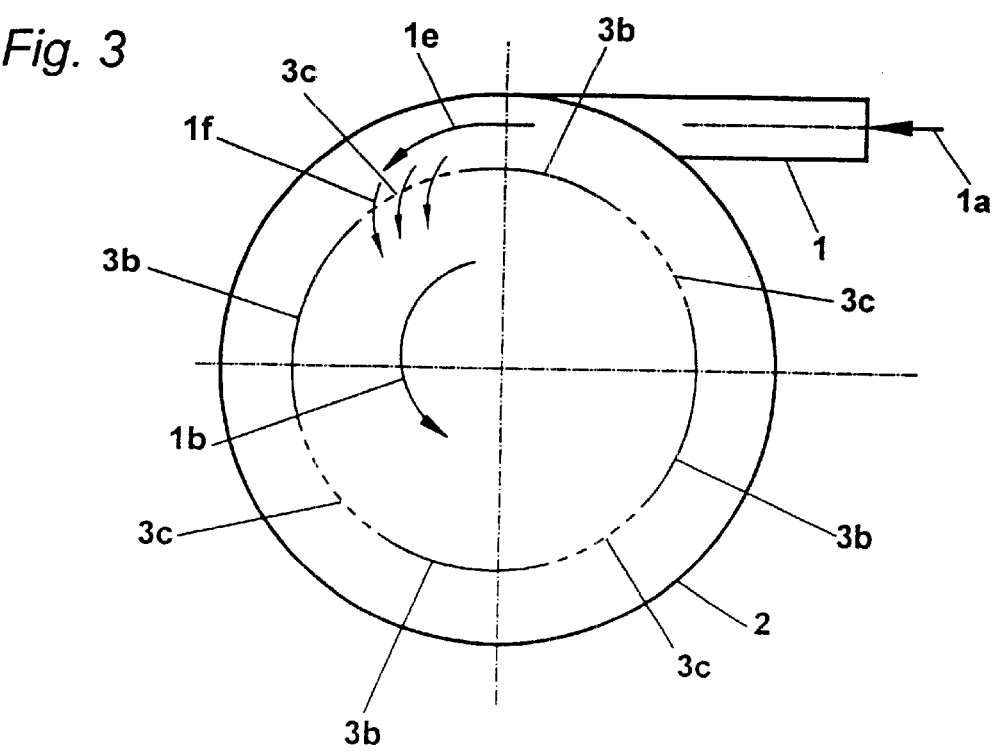
FIG. 3, a schematic top view of the cyclone separator illustrated in FIG. 1, with several flow rectifiers extending across a part of the housing wall.

FIG. 3 shows an additional possible embodiment of a flow rectifier 3c, which can be used, for example, in the design example illustrated in FIG. 1. In this case, along a part of the perimeter of the housing wall there is a flow rectifier 3c (e.g., of the kind described above); but also several flow rectifiers can be provided along the perimeter, as is illustrated, e.g., in FIG. 3. In this regard, the flow rectifiers are separated from each other by wall segments 3b of the housing wall. Furthermore, the flow rectifiers 3c can be the same or different, for example, flow rectifiers in the form of honeycomb networks and alternating with a mesh format. But preferably, the same flow rectifiers 3c are provided along the perimeter of the housing wall, in order to form a well-defined, rotation-symmetrical primary flow 1b.

The mode of operation of the invented cyclone separator will be explained in greater detail below, based on the design example illustrated in FIG. 1. The fluid 1a to be cleaned flows through an inlet 1 into the ring channel 2, and passes through the flow rectifier or flow rectifiers 3 into the interior of the housing 4. The fluid 1a then flows roughly in a spiral around the longitudinal axis of the housing 4 in the direction of the bottom wall 6 (indicated by the arrow 1b) and is deflected in the vicinity of the bottom wall 6 roughly in the radial direction toward the outlet 8, near which it experiences an additional deflection roughly in the direction of the inlet 1 or the front surface 5 (indicated by arrow 1c). In order that the fluid can flow off through the outlet 8 for the cleaned fluid 8a, it must again change its axial direction of motion by about 180 degrees (indicated by arrow 1d). A cleaned fluid 8a essentially free of dispersed substances flows through the outlet 8.

In general, the specific, heavier substances collect in the vicinity of the wall region of the housing 4, and are transported by the flow 1c rotation-like in the direction of the longitudinal axis of the housing to the bottom wall 6. Due to the axial reversal of direction of the flow in the vicinity of the outlet 8 for the cleaned fluid near the rotation axis, the specifically heavier substances (dispersed substances) essentially settle out there and are eliminated through the outlet openings 9b which are located in this region in the dish-like bottom wall 6, through the outlet 9 for the dispersed substances. The degree of separation is greatly dependent on the rate of flow (and on the resultant accelerations) of the fluid 1a. Furthermore, the degree of separation is additionally affected by the flows through the particular outlets 8, 9 for the cleaned fluid 8a and the dispersed substances 9a. These flow conditions can be adapted to the desired degree of separation, preferably by means of adjustable valves located e.g. in the outlet lines. A typical flow ratio between the outlet 8 for the cleaned fluid 8a and the outlet 9 for the fluid 9a containing the dispersed substances is e.g., 10:1.

The cyclone separator according to this invention (e.g., in the design format illustrated in FIG. 1) can also be composed of one or more additional flow rectifiers (not illustrated in FIG. 1), which are located in the inlet 1, in order to rectify the linear flow of the fluid 1a right in the inlet.

Furthermore, the cyclone separators according to this invention (e.g., from FIG. 1) also are composed of flow control surfaces (not illustrated) in the interior of the housing 4, in order to divert e.g., the axial directional deflection 1d of the fluid flow along defined paths, so that the degree of separation can be additionally affected. The flow control surfaces can be designed in the form of flow elements or in the form of planar, convex or concave curved plates, which are placed in the direction of the inlet 1 at a certain distance from the outlet 8 for the cleaned fluid 8a concentric to the longitudinal axis of the cyclone housing 4.

Figure 4:
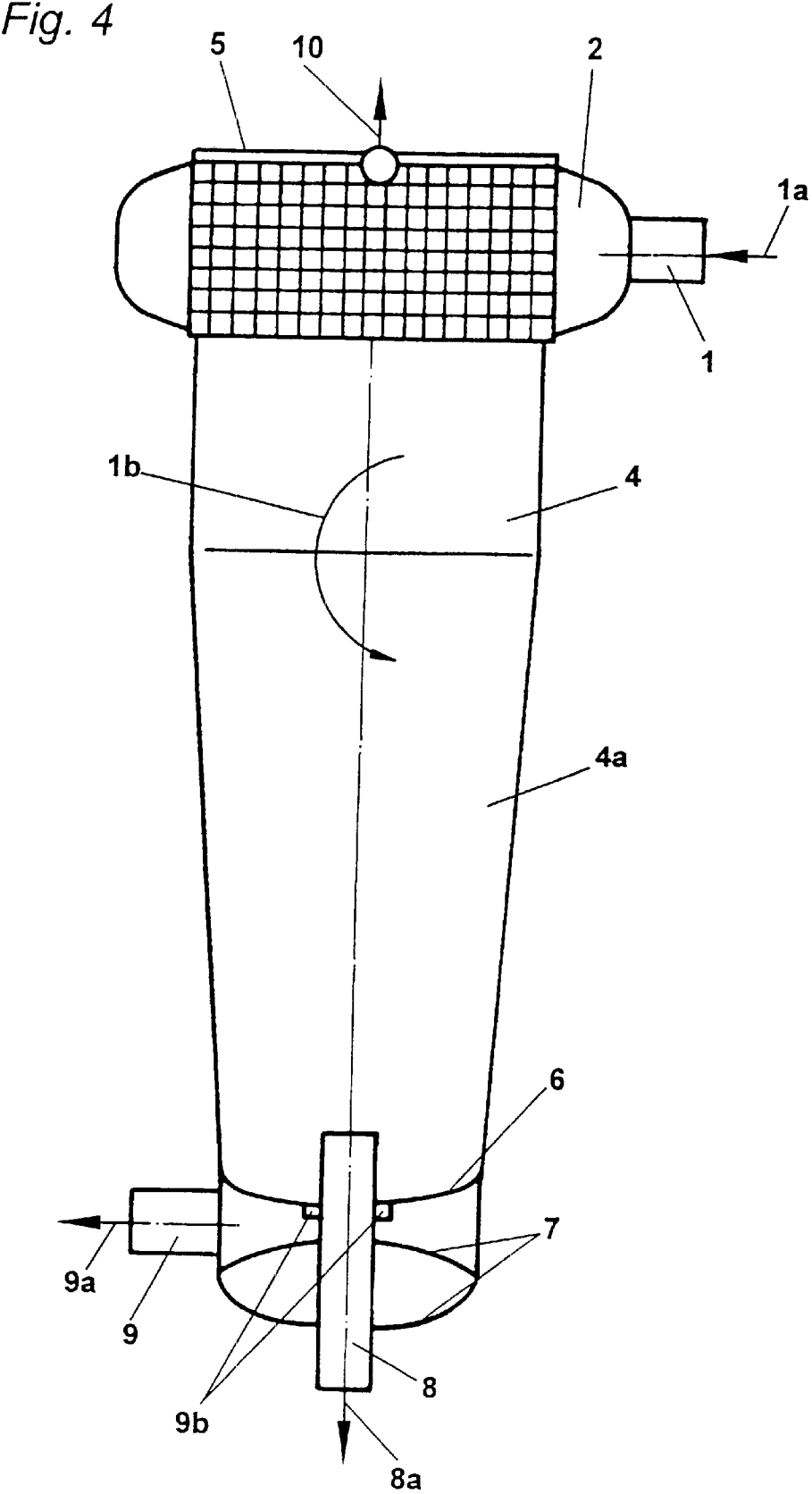
FIG. 4, a schematic side view of an additional design example of the invented cyclone separator with a conical housing wall formed in sections.
Figure 5:
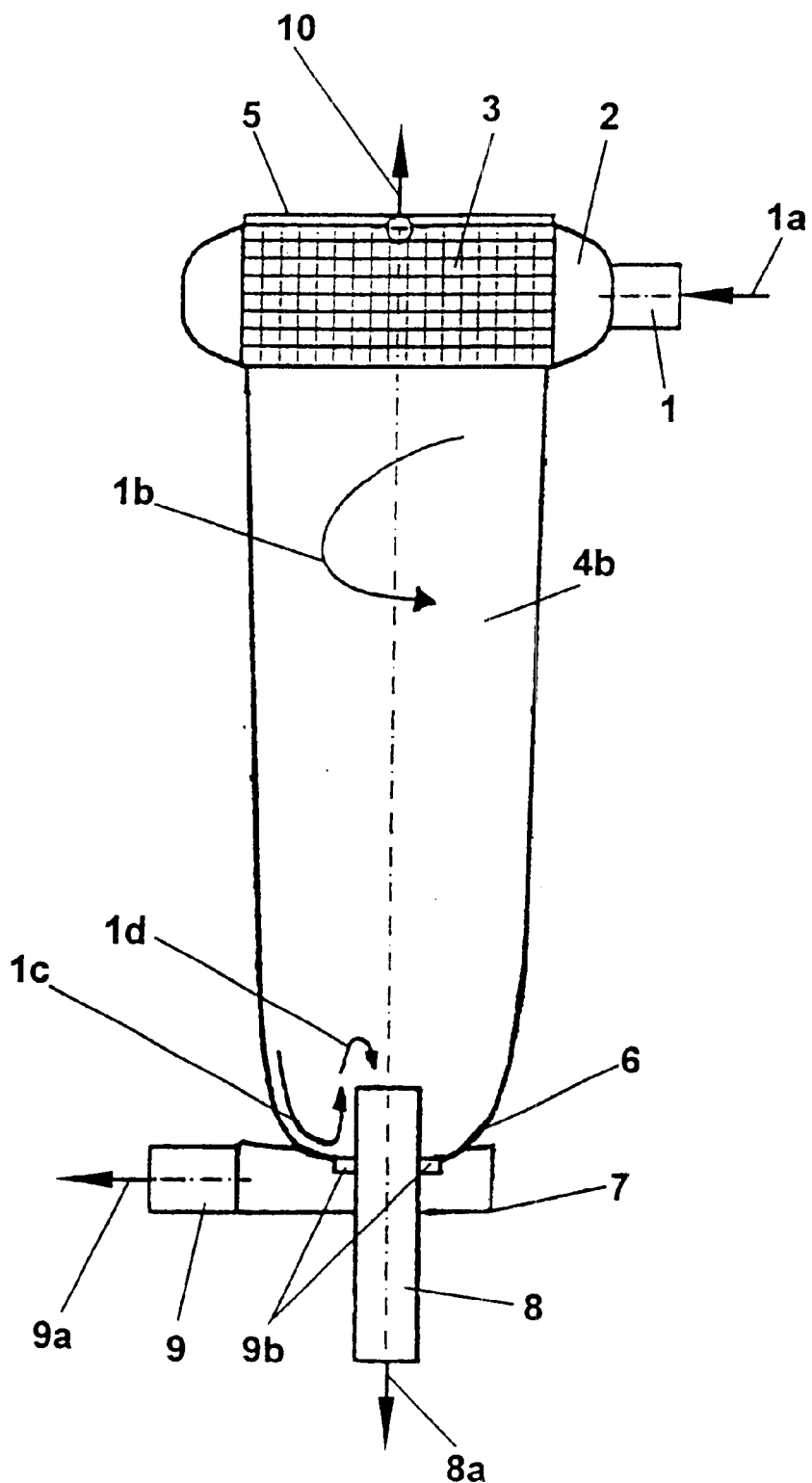
FIG. 5, a schematic side view of an additional design example of the invented cyclone separator with dish-like housing wall.

FIGS. 4 and 5 present two additional design examples of the invented cyclone separator in schematic format, and the same or equivalent parts are identified with the same reference numbers as in FIG. 1.

The two design examples differ from the cyclone separator illustrated in FIG. 1, in that the shape of the rotation-symmetrical housing 4, 4a, 4b is different. The cyclone separator illustrated in FIG. 4 is composed of a cylindrical-shaped housing 4 in the region of the ring channel 2, and a conical-shaped housing 4a joins the cylindrical one. The diameter of the conical housing decreases steadily and finally passes into the dish-like bottom wall 6. Because a part of the housing 4, 4a is of conical shape, the rotation speed in the conical-shaped part 4a of the housing 4, 4a increases with decreasing housing diameter, so that the centrifugal effect increases steadily along the housing 4, 4a, and thus promotes the separation of substances of differing density. In the region of the bottom wall 6, and of the outlet openings 9b and of the outlet 8 for the cleaned fluid 8a, similar flows and separating effects occur like that already described in conjunction with FIG. 1.

Instead of a cylindrical and/or conical design of the housing wall, it can also be designed as dish-like going down to the ring channel 2, as is indicated in FIG. 5. In this case, the housing 4b in the region of the ring channel 2 is preferably of cylindrical shaped design, however, it can continue the dish-like shape out into the region of the ring channel. Here, too, the rotational speed of the fluid 1a to be cleaned increases with decreasing housing diameter, so that the separating effect is increased in the direction of the outlet 8 for the cleaned fluid 8a due to the increasing centrifugal effect. The axial flow deflections 1c and 1d in the vicinity of the bottom wall 6, of the outlet 8 and also of the outlet openings 9b, occur similar to that described in FIG. 1, so that a similar, good separation of the dispersed substances is achieved. The dispersed substances 9a and the cleaned fluid 8a are eliminated as described in FIG. 1.

Figure 6:
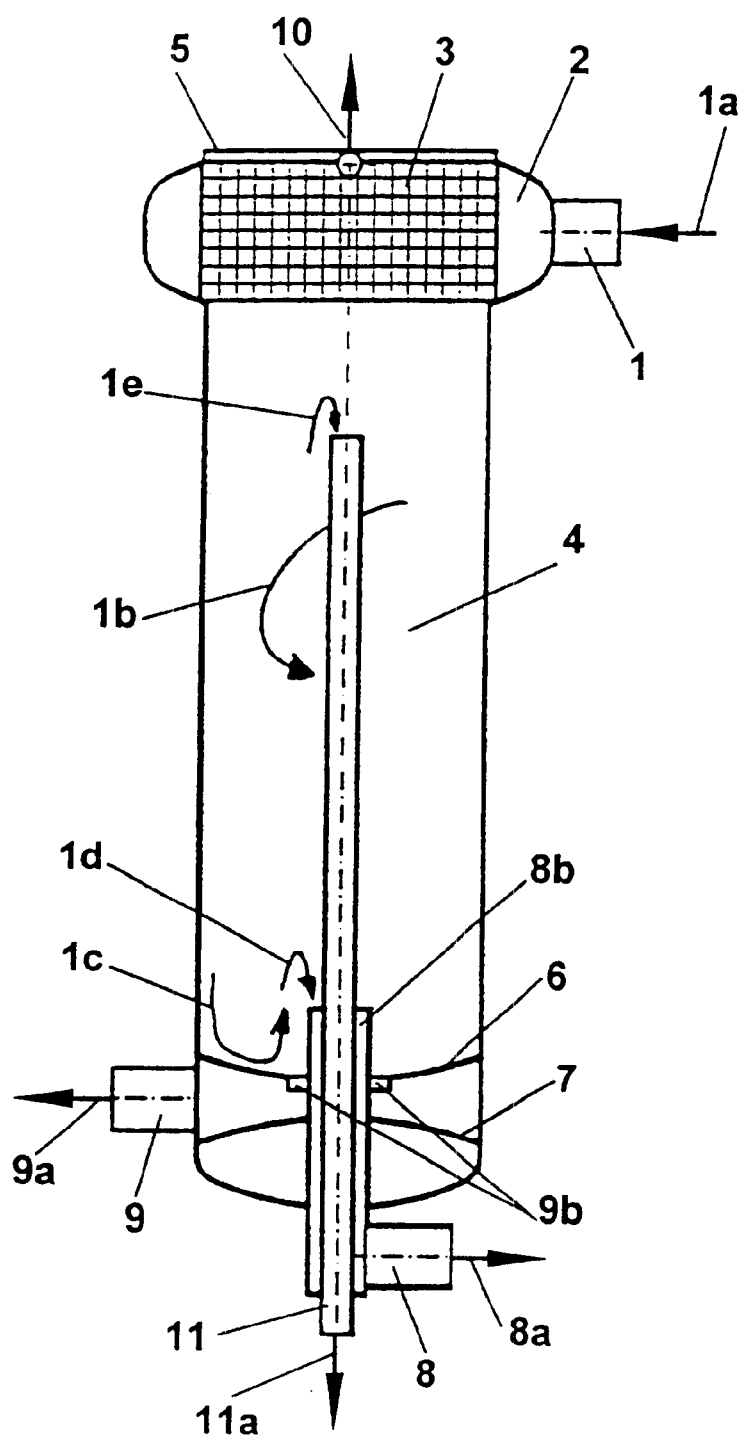
FIG. 6, an additional design example of the invented cyclone separator with a second outlet located concentric to the longitudinal axis.

FIG. 6 shows an additional design example of the invented cyclone separator which is of a structure similar to the cyclone separator illustrated in FIG. 1, so that therefore the same and equivalent parts have the same designations. In this design, an additional outlet 11 is provided, which is supplied in the form of a tube positioned concentric to the longitudinal axis, said tube is located in sections within the tube 8 which forms the outlet for the cleaned fluid 8a. Here, again, the two tubes 11 and 8 are mounted with respect to each other so that an annulus forms between the two tubes, through which the cleaned fluid 8a can be removed through the tube 8. The second tube 11 runs in sections within the tube 8 and protrudes in the direction of the inlet past the tube 8 by a particular length into the interior of the housing. Preferably the primary, ring-like flow 1b moves additionally along the rotation axis through the second tube 11, so that the flow is of a highly rotation-symmetrical formation, especially in the region about the tubes 8, 11 of the two outlets, which additionally improves the degree of separation. The axial flow conditions 1c, 1d in the region of the dish-like bottom wall 6 and of the outlet 8 for the cleaned fluid 8a, and their effect on the degree of separation of substances of differing density, are presented similar to that in FIG. 1 in this design example.

Due to corresponding selection of the outlet quantity through the outlet 9 for the dispersed substances 9a, the outlet 8 for the cleaned fluid 8a and the second tube 11, likewise the degree of separation for the cleaned fluid 8a can be affected. Furthermore, it is possible, through suitable selection of the flow speeds and of the flows through the outlets 9, 8 and 11, to implement a fractional separation of the dispersed substances. In particular, the second outlet (the second tube) 11 is suitable for separating specifically lighter substances (e.g., floating substances) with respect to the fluid, from the fluid 1a to be cleaned (indicated by arrow 1e).

For fractional separation, in particular more than two tubes can be placed concentrically within one another so that they run at least in sections within the outlet 8 for the cleaned fluid 8a, where the tubes of smaller diameter each protrude farther into the interior of the housing past the outlet 8 for the cleaned fluid 8a, and where a ring channel for outlet of fluid is formed between neighboring tubes.

Figure 7:
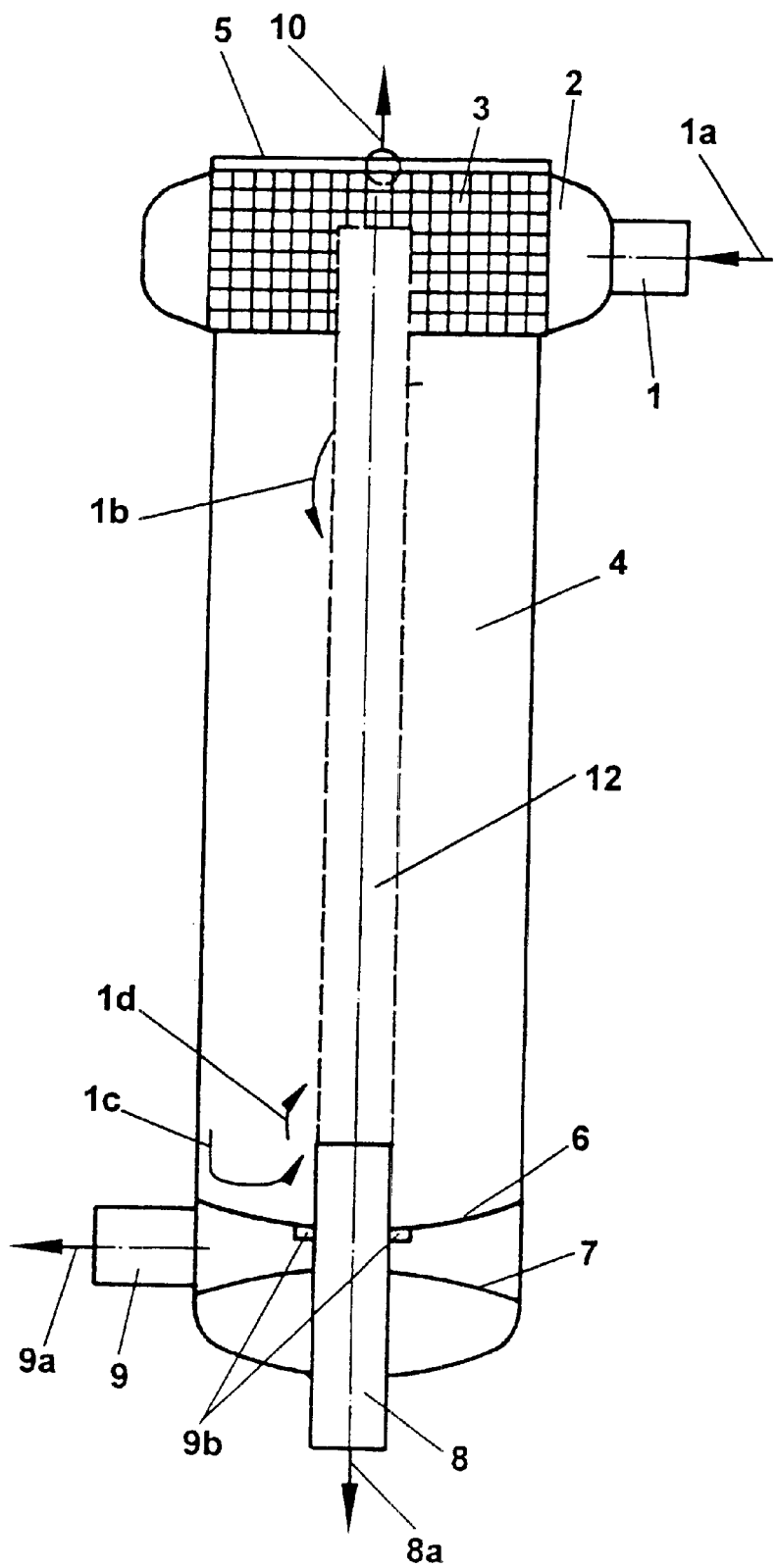
FIG. 7, a schematic side view of an additional design example of the cyclone separator according to this invention, with a filter device.

FIG. 7 shows the design example of an invented cyclone separator illustrated in FIG. 1. In this case, with an extension of the outlet 8 for the cleaned fluid 8a in the direction of the ring channel, a hollow, cylindrical-shaped filter 12 is provided that acts as a retention filter for the dispersed substances, so that the quality (purity) of the cleaned fluid 8a will be additionally improved.

In general, a filter device can be provided at the outlet 8 which additionally has a cleaning device for cleaning of the filter from the retained, dispersed substances.

Figure 8:
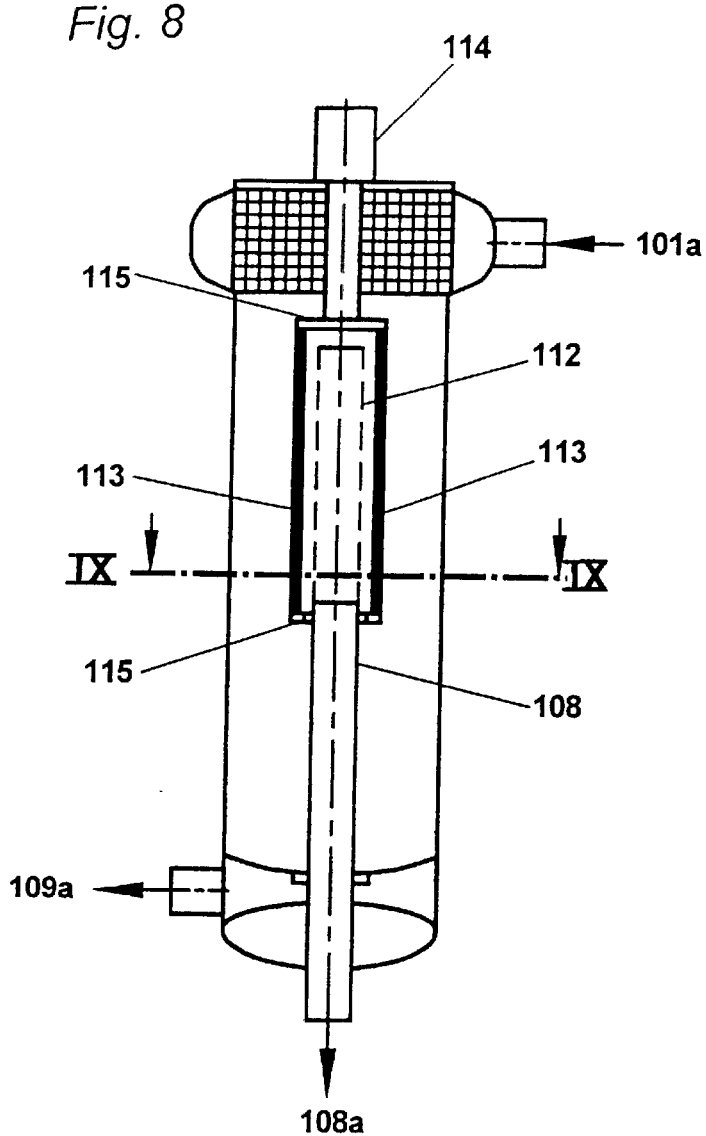
FIG. 8, a schematic side view of an additional design example of the invented cyclone separator with a filter device and flow control surface positioned at a distance from the surface region of the filter, and a drive unit for this flow control surface.

FIG. 8 shows a design example of the invented cyclone separator which is changed with respect to FIG. 7, and again, the same parts in FIG. 8 have their reference numbers increased by 100 with respect to the identifications used in FIG. 7. In addition to the design format presented in FIG. 7, in FIG. 8 flow control surfaces 113 are located at a distance from the surface region of the filter 112. The flow control surfaces 113 are configured in such a manner that a nozzle effect that increases the speed of flow is exerted onto the part of the fluid flowing between one flow control surface 113 and the surface region of the filter 112. In one simple design of the invention, a flat plate can be used as flow control surface; this plate is set up in a plane parallel to a tangential plane at a distance to the surface of the hollow cylindrical-shaped filter. Additional design formats are composed of flow control surfaces whose cross sections have a diamond-shaped, planar-convex, biconvex or support-surface structure. In general, the cross section of a flow control surface can change both its shape and also its size (cross sectional surface area) along the axis of the cyclone separator.

Figure 9:
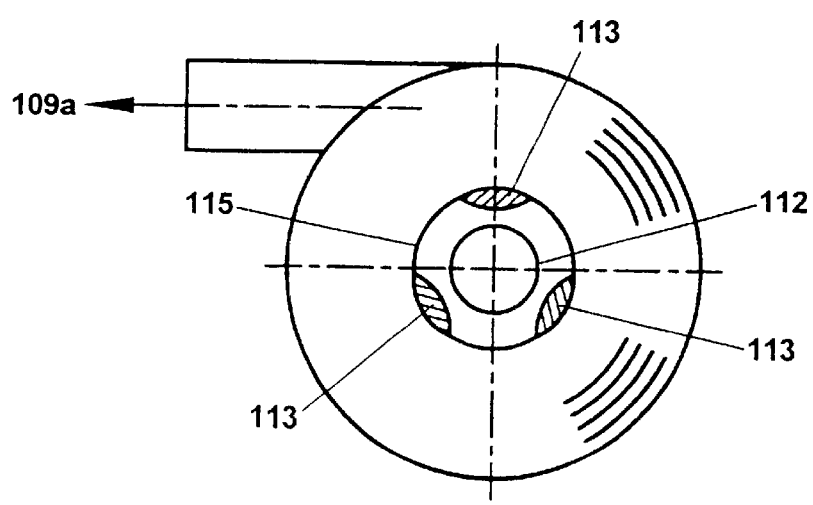
FIG. 9, a schematic cross-sectional view along the line IX—IX in FIG. 8.

The flow control surfaces 113 in FIGS. 8 and 9 are designed in the shape of the profile of three rods. The rods extend parallel to the axis of the filter 112 and at a distance from the surface of the filter. They are attached to a mount 115 (e.g., a turnstile) and can rotate in one preferred design format, about the axis of the filter 112, so that the speed of rotation and the direction of rotation can be controlled, for example, by a drive unit 114.

On the other hand, the design can also be arranged so that the flow control surfaces 113 are of permanent design and the filter 112 can be caused to rotate by a drive unit (not illustrated), so that a rotation in and opposite the direction of flow is possible.

In another special design format, both the flow control surfaces 113 and also the filter 112 can rotate about the cylinder axis, and the rotation of the flow control surfaces 113 and of the filter 112 can be both in the same, and also in the opposite direction to each other, and in the same direction or opposite the direction of the in-flowing fluid 101a to be filtered.

FIG. 9 shows a schematic cross section through the design format illustrated in FIG. 8. The rods forming the three flow control surfaces 113 each have a biconvex cross section and are located at an angular spacing of e.g., 120 degrees around the hollow cylindrical-shaped filter 112 and if necessary, can rotate with the drive unit 114 jointly around the filter 112.

The mode of operation of the design examples of the invented cyclone separator illustrated in FIG. 8 and FIG. 9 will be described below. The surface of the filter insert 112 will be cleaned by the flow control surfaces 113 due to the dosing effect in the region of the increased rate of flow, due to the reduced static pressure (and the potentially occurring cavitation), since in this region the local radial component in the direction of flow is significantly reduced or even reversed.

Due to the reduced static pressure on the filter surface and the increased rate of flow of the fluid 101a to be filtered, the filter residue can be detached. Depending on the radial pressure gradient in the filter 112, when the static pressure in the interior of the filter is sufficient, a reversal of the direction of flow can also occur in this region, so that the fluid—instead of flowing from the outside in the direction of the cylinder axis—will flow from this axis in the direction of the flow control surface, so that the filter residue will be additionally detached. Provided the flow conditions have been selected so that cavitation is produced, a detachment of the filter residue can be additionally promoted.

If the filter insert 112 is set into rotation by means of a (not illustrated) drive unit, then with fixed-position flow control surfaces 113, nearly the entire surface (mantle surface) of the filter insert 112 can be cleaned. Due to selection of the rotational direction and of the rotational velocity, the force of the nozzle effect (i.e., the static pressure on the filter surface in the region of the flow control surfaces) can be controlled. If the filter is rotated opposite the direction of flow of the flowing fluid 101a to be cleaned, then the speeds of the fluid and of the filter insert are added together, and powerful nozzle effects up to and including cavitation at the filter surface can be created. With this kind of arrangement we have the advantage that the cavitation occurs first at the filter, and not at the flow control surface, so that the cavitation can be used to clean the filter.

If cavitation is to be avoided due to material reasons, and if the rate of flow of the fluid 101a is already very high, then the filter insert 112 can be turned preferably in the rotary direction of the fluid 101a.

Alternative to the rotation of the filter insert 112, as described above, the flow control surfaces 113 can be rotated about the cylinder axis by a drive device 114. Therefore, for rotation in the flow direction of the fluid 101a, its rotation flow can be promoted and the appearance of a cavitation at the flow control surfaces 113 can be prevented. When rotating the flow control surfaces 113 opposite the direction of flow of the fluid 101a, cavitation effects and eddy fields can be generated.

In an additional design format, both the filter 112 and also the flow control surfaces 113 can rotate about the cylinder axis, and cavitation can be prevented entirely, depending on the direction of rotation, or preferably it can be created either at the flow control surfaces 113 or the filter surface 112. Furthermore, in general the profile of the flow control surfaces 113 can change in the direction of the rotation axis, in order to adapt the flow control surfaces 113 to any pressure gradient present in this direction.

Figure 10:
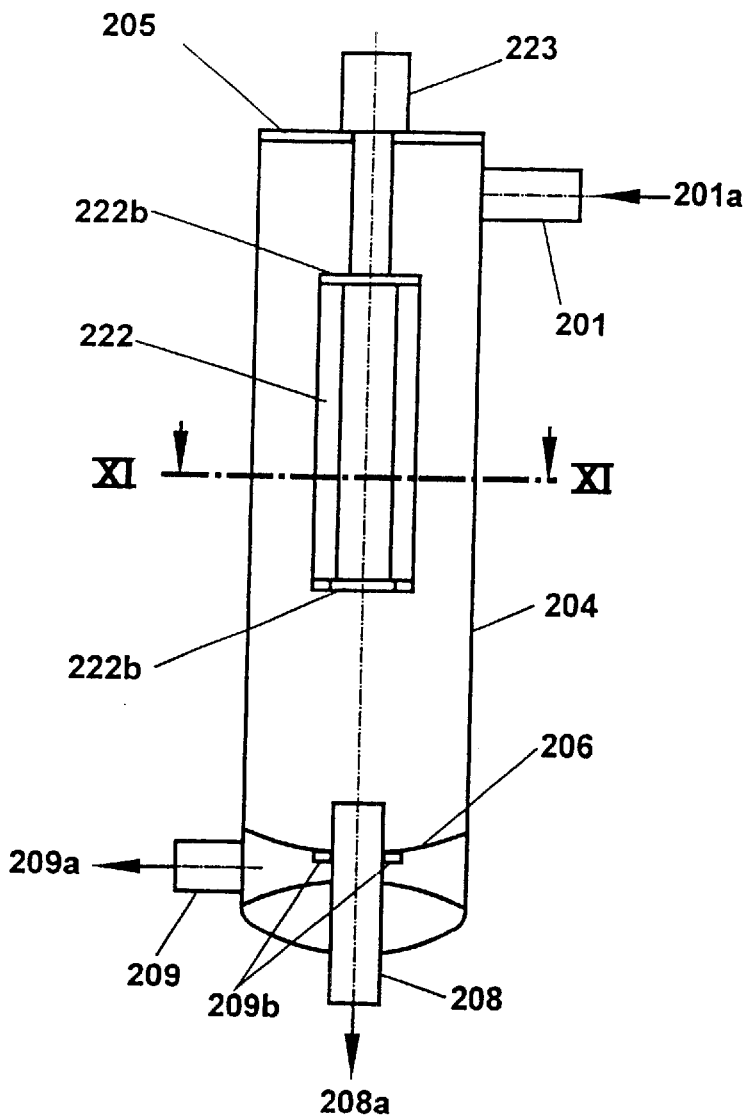
FIG. 10, a schematic side view of one design example of the invented cyclone separator with cylindrical-shaped housing wall.
Figure 11:
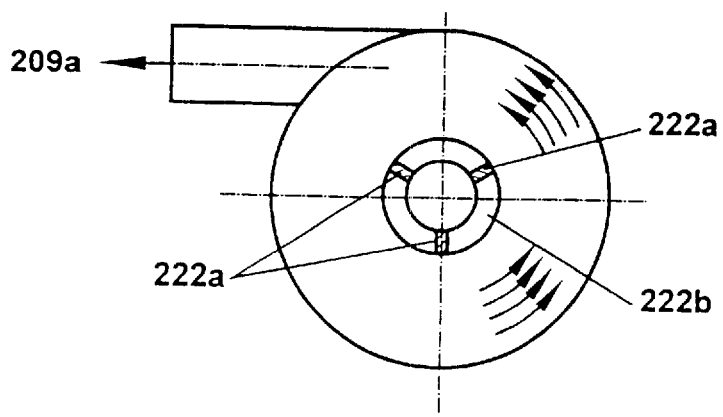
FIG. 11, a schematic cross sectional view along the line XI—XI in FIG. 10.

FIGS. 10 and 11 show schematically one design example of a cyclone separator according to this invention, and the same parts as in FIG. 1 are identified with a reference number increased by 200 compared to FIG. 1. The inlet 201 for the fluid 201a containing the dispersed substances opens essentially tangentially into the interior of the housing 204. A rotor 222 is mounted on the axis of the housing 204 and rotates about this axis and is driven by a motor 223. The rotor blades 222a of the rotor are formed by radially positioned plates which are located at an angular spacing of e.g., 120 degrees around the rotation axis and are held at their ends against two ring-shaped mounts 222b in such a manner that they extend in their longitudinal direction essentially parallel to the longitudinal axis of the cyclone. By means of this rotor the rotational movement of the fluid guided into the interior of the housing 204 can be favorably enhanced.

Figure 12:
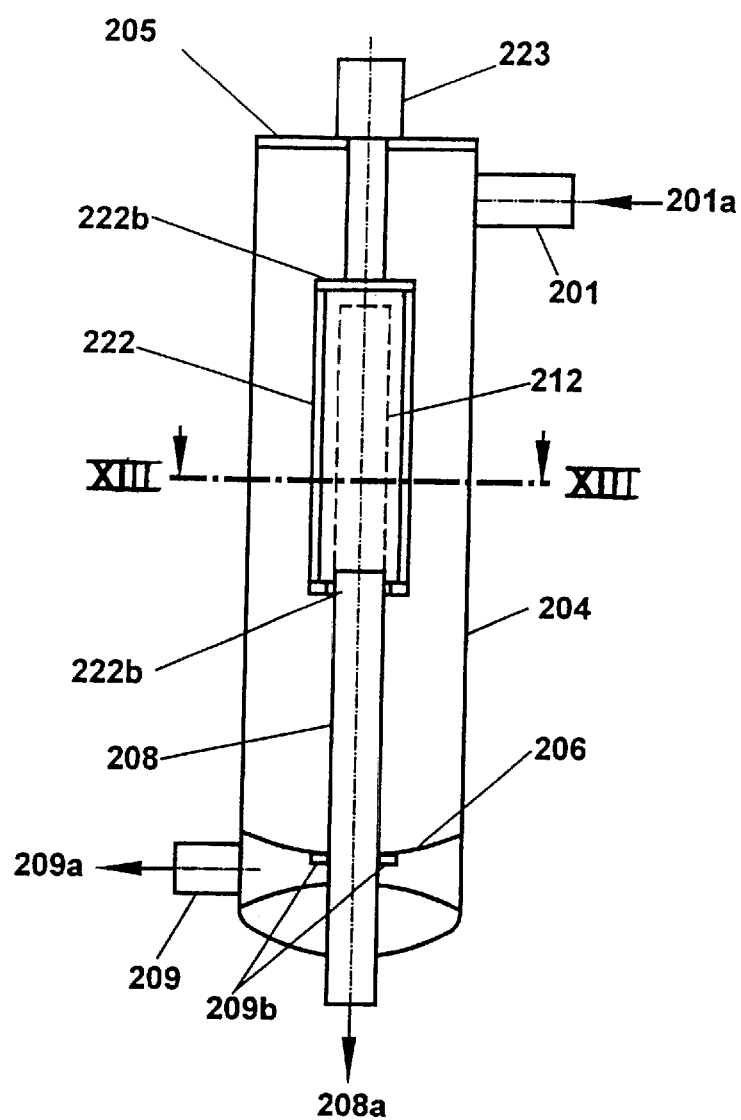
FIG. 12, a schematic side view of another design example of the invented cyclone separator with a filter device and rotor vanes in the form of flow control surfaces located at a distance from the surface region of the filter.
Figure 13:
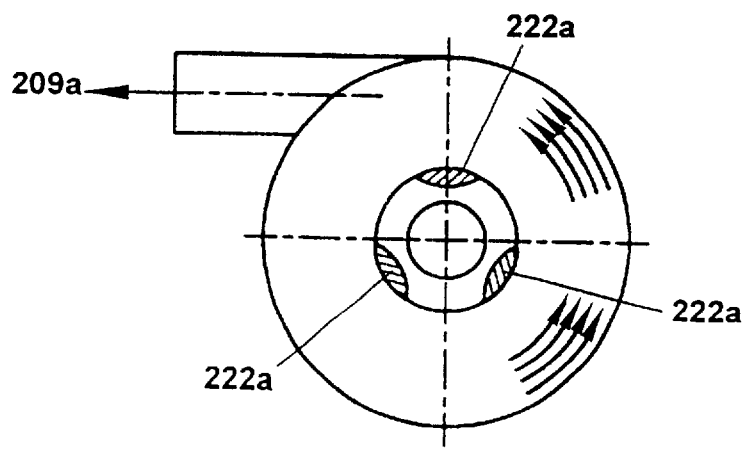
FIG. 13, a schematic cross section along the line XIII—XIII in FIG. 12.

FIGS. 12 and 13 show a similar design format as in FIGS. 10 and 11. In this design format—in contrast to the outlet tube 208 extended from the front surface 205 in FIG. 10—a hollow cylindrical-shaped retention filter 212 is indicated by dashed lines. The retention filter forms a hollow-cylindrical continuance of the outlet tube 208 corresponding essentially to the shape of the tube. In this configuration, the rotor 222 is positioned with respect to the retention filter 212 such that the rotor blades 222a extend in the longitudinal direction of the retention filter and at a distance from it. In the present case, the rotor blades 222a have a biconvex cross section, as shown in FIG. 13. Based on this particular format, when the rotor blades 222a rotate about the longitudinal axis of the filter, a vacuum is created between rotor blade and filter due to the fluid flowing through between them. This vacuum causes a detachment of filter residues from the surface of the filter 212. At the same time, the rotational movement of the fluid in the cyclone will be promoted.

Figure 14:
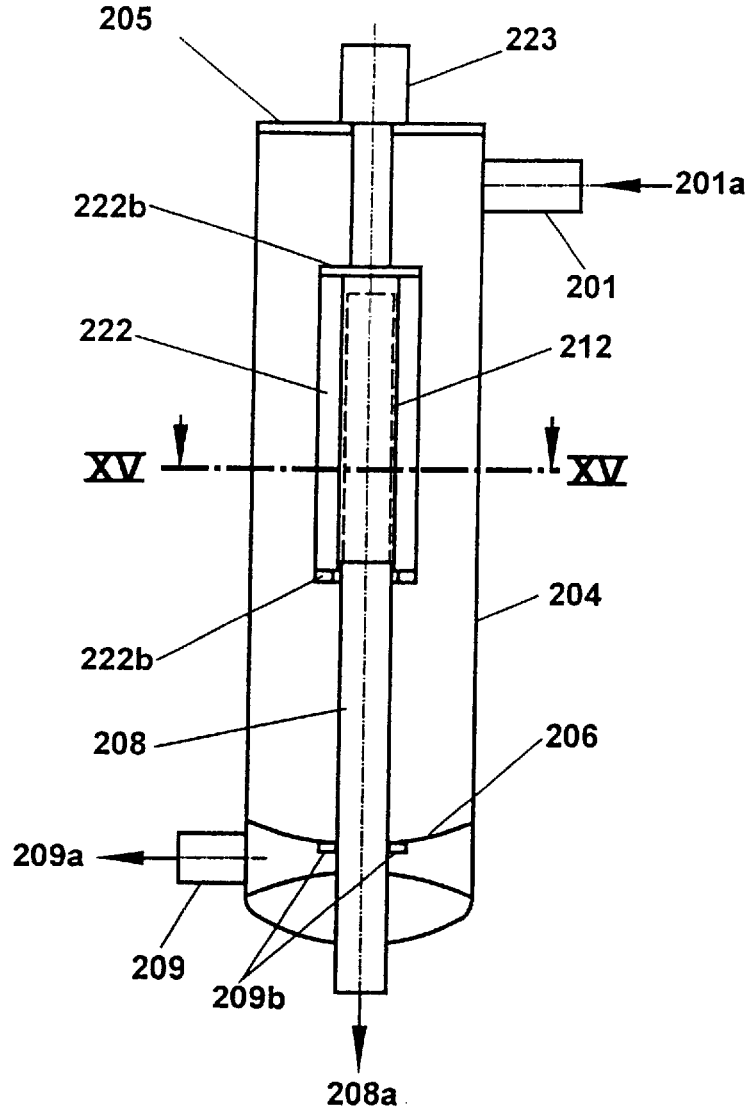
FIG. 14, a schematic side view of an additional design example of the invented cyclone separator with a filter device and rotor vanes in the form of radially positioned plates.
Figure 15:
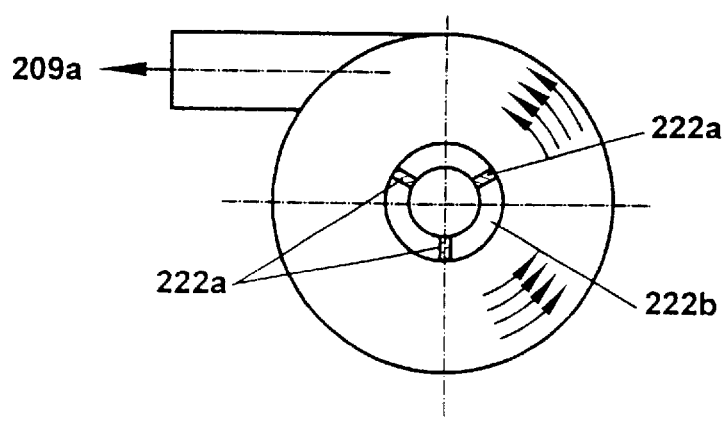
FIG. 15, a schematic cross section along line XV—XV in FIG. 14.

The design example illustrated in FIGS. 14 and 15 differs from the design examples illustrated in FIGS. 12 and 13 only inasmuch as the rotor blades are designed, as is evident in FIG. 15, similar to the design example in FIGS. 10 and 11, in the form of radially extending plates. In this design example, the dimensions of the outer diameter of the retention filter 212 on the one hand, and of the diameter of the path along which the inner edges of the rotor blades 212a can move, are kept small, such that the rotor blades act simultaneously as a mechanical stripper of the surface of the retention filter 212, while on the other hand, under rotation about the axis of the cyclone, they cause simultaneously an increase in the rotational motion of the fluid in the cyclone.

The invented cyclone separator can be used, for example, as a self-cleaning supply and storage tank. In this case the fluid 1a to be cleaned will flow through the inlet 1 into the housing 4, so that due to the special fluid flow described above, a separating effect will occur within the housing. The outlets for the cleaned fluid 8a, for the dispersed substances 9a and for any floating substances 11a, can be closed, for example, by valves, so that after the inlet of the fluid containing the dispersed substances and after the flow calms down in the housing 4, a gravitative separation (settling separation) of substances of different density will take place. Thus, substances specifically heavier than the fluid will settle out onto the bottom wall 6 in the vicinity of the outlet openings 9b, and can be eliminated through them, e.g., after a particular time, while the fluid is preferably at rest in the housing 4.

Due to the cyclone effect occurring upon inlet of the fluid 1a and due to the gravitational separation, we obtain through the outlet 8 for the cleaned fluid 8a a cleaned fluid which is free of dispersed substances. If only enough fluid is removed through the outlet 8 (for the cleaned fluid 8a) so that in the case of a liquid, the liquid level is clearly above the inlet opening of the tube 8, then the drained, cleaned liquid 8a is also essentially free of specifically lighter, floating substances. They can be drained preferably through the second tube 11 (see FIG. 6). Thus, the second tube 11 can also serve as an overflow, for instance, if no valve is provided for this tube or if the valve belonging to the tube 11 is open. Opening or closing of the valves of the outlets 8 and/or 11, 9 and of the inlet 1, can take place by means of appropriate liquid level measuring devices. Thus, an overfilling (an excessive liquid level in the housing 4) of the cyclone or an excessive lowering of the liquid level in the housing 4, can be prevented, so that a corresponding quality of the cleaned liquid removed from the outlet 8, will be assured.

As described above, several tubes can be provided concentrically inside each other, through which the floating substances can be removed, depending on the liquid level in the housing 4.

The cyclone separator can alternatively be operated so that the housing 4 is filled through the inlet 1 with the liquid to be cleaned, and so that then through the outlets a much cleaner flow—in comparison to the inlet—can be removed continuously, and/or the floating substances or the dispersed substances can be removed. Furthermore, an operation is possible such that removal is possible continuously at certain outlets, and that other outlets can be activated only briefly after specified times or depending on a fill level monitoring device.

The cyclone used as supply or storage tank can be employed e.g., in households for cleaning of drain water (e.g., bath or shower water, washing machine water). The cleaned water can then re reused, for example, wherever drinking water quality is not required, such as in toilet flushing.

What is claimed is:

1. A cyclone separator comprising:

a housing generally symmetric about its central longitudinal axis, an inlet disposed adjacent a front surface of the housing for introduction of a fluid containing dispersed substances generally tangential to the longitudinal axis, the inlet opening into a ring channel surrounding the housing adjacent the front surface, at least a portion of a wall of the housing shaped to form a flow rectifier connecting the ring channel to an interior of the housing, an opposite side of the housing from the front surface having a dish-shaped bottom wall at least a portion of which is inclined toward the longitudinal axis of the housing, an outlet for the cleaned fluid comprising a tube through the bottom wall having an axis coaxial with the longitudinal axis, said tube extending from the bottom wall by a defined length in the direction of the front surface, an outlet for the dispersed substances having the shape of an annular channel in the bottom wall disposed adjacent the tube and adjacent a rotation axis of the fluid whereat high-density substances settle.

2. A cyclone separator according to claim 1 wherein the flow rectifier extends along the perimeter of the housing wall generally at a level of the ring channel.

3. A cyclone separator according to claim 1 characterized in that the flow rectifier is formed by a mesh lattice.

4. A cyclone separator according to claim 1 wherein the flow rectifier has a honeycomb-like structure.

5. A cyclone separator according to claim 1 wherein the flow rectifier is composed of rods arranged parallel to the longitudinal axis to form a lattice structure.

6. A cyclone separator according to claim 1 wherein the flow rectifier is composed of gaps in the housing wall running parallel to the longitudinal axis.

7. A cyclone separator according to claim 1 further comprising a plurality of similar flow rectifiers each extending over a part of the housing wall at a level of the ring channel and arranged along the perimeter of the housing wall.

8. A cyclone separator according to claim 1 further comprising a plurality of different flow rectifiers, each extending over a part of the housing wall at the level of the ring channel, are arranged along the perimeter of the housing wall.

* * * * *